UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AURIN DYE.

978,801.  Specification of Letters Patent.  Patented Dec. 13, 1910.

No Drawing. Original application filed April 27, 1910, Serial No. 557,950. Divided and this application filed August 12, 1910. Serial No. 576,836.

*To all whom it may concern:*

Be it known that I, MAX WEILER, doctor of philosophy, chemist, citizen of the German Empire, residing at Elberfeld, Germany, have invented new and useful Improvements in New Dyestuffs, of which the following is a specification.

This application which is a divisional application of my application Serial No. 557,950 relates to the production of a new dyestuff of the aurin series, which is obtained by condensing in the presence of oxidizing agents methylene-di-ortho-cresotinic acid with 2-naphthol-3.6-disulfonic acid.

The new dye is a dark red powder soluble in water with an orange-red color, in dilute caustic soda lye with a violet color, dyeing wool from acid baths a blue shade after chroming on the fiber.

In order to illustrate the new process more fully the following example is given, the parts being by weight:—95 parts of methylene-di-ortho-cresotinic acid and 116 parts of 2-naphthol-3.6-disulfonic acid are stirred at from 20–45° C. together with 1500 parts of a strong sulfuric acid and the necessary quantity of nitrosyl-sulfuric acid until the quantity of the dyestuff produced does no longer increase and the evolution of nitrogen oxids ceases. The product of the reaction is poured on ice and salt and the dyestuff is filtered off and purified by resolution.

I claim:—

The herein described new dyestuff obtainable from methylene-di-ortho-cresotinic acid and 2-naphthol-3.6-disulfonic acid which is a dark red powder soluble in water with an orange-red color, in caustic soda lye with a violet color, dyeing wool blue shades after chroming, substantially as described.

In testimony whereof I have hereunto set my hand in the presence of two subscribing witnesses.

MAX WEILER. [L. S.]

Witnesses:
 CHAS. J. WRIGHT,
 ALFRED HENKEL.